(12) United States Patent
Wang et al.

(10) Patent No.: US 9,963,526 B2
(45) Date of Patent: May 8, 2018

(54) PROCESS FOR POLYMERIZATION USING DENSE AND SPHERICAL ZIEGLER-NATTA TYPE CATALYST

(71) Applicant: NOVA Chemicals (International) S.A., Fribourg (CH)

(72) Inventors: Qinyan Wang, Calgary (CA); Savini Udara Suduweli Kondage, Endeavour Hills (AU); Mark Kelly, Airdrie (CA); Amy Marie Baltimore, Calgary (CA); Jessamyn Ross Logan, Calgary (CA); Tyler Craig, Vancouver (CA)

(73) Assignee: NOVA Chemicals (International) S.A., Fribourg (CH)

( * ) Notice: Subject to any disclaimer, the term of this patent is extended or adjusted under 35 U.S.C. 154(b) by 0 days. days.

(21) Appl. No.: 15/137,241

(22) Filed: Apr. 25, 2016

(65) Prior Publication Data

US 2016/0326282 A1    Nov. 10, 2016

(30) Foreign Application Priority Data

May 7, 2015   (CA) .................................... 2890606

(51) Int. Cl.
 *C08F 210/16*   (2006.01)
(52) U.S. Cl.
 CPC ........ *C08F 210/16* (2013.01); *C08F 2410/02* (2013.01)
(58) Field of Classification Search
 None
 See application file for complete search history.

(56) References Cited

U.S. PATENT DOCUMENTS

| | | |
|---|---|---|
| 3,248,179 A | 4/1966 | Norwood |
| 4,127,507 A | 11/1978 | Fannin et al. |
| 4,250,288 A | 2/1981 | Lowery, Jr. et al. |
| 4,325,849 A | 4/1982 | Rosen et al. |
| 4,543,399 A | 9/1985 | Jenkins, III et al. |
| 4,588,790 A | 5/1986 | Jenkins, III et al. |
| 4,613,484 A | 9/1986 | Ayres et al. |

(Continued)

FOREIGN PATENT DOCUMENTS

| | | |
|---|---|---|
| CA | 1189053 | 6/1985 |
| CA | 1209745 | 8/1986 |

(Continued)

OTHER PUBLICATIONS

Particle Analysis in the SEM—AZtecFeature—Copyright Oxford Instruments plc (2017); Downloaded from https://www.oxford-instruments.com/products/microanalysis/energy-dispersive-x-ray-systems-eds-edx/eds-for-sem/aztecfeature, May 31, 2017, pp. 1-13.

(Continued)

*Primary Examiner* — Catherine S Branch
(74) *Attorney, Agent, or Firm* — Julie L. Heinrich (57) ABSTRACT

Some embodiments herein disclose a process for producing an ethylene polymer or copolymer which contains less than 5 ppm titanium and has a bulk density, in granular form, of at least 22.5 lbs/ft$^3$, using a spheroidal Ziegler-Natta type olefin polymerization catalyst having a particle size distribution characterized by a Dm*/Dn of less than 3.0 and comprising a titanium compound, an aluminum compound, and a spheroidal magnesium chloride support.

7 Claims, 9 Drawing Sheets

(56) References Cited

U.S. PATENT DOCUMENTS

| | | | |
|---|---|---|---|
| 5,028,670 | A | 7/1991 | Chinh et al. |
| 5,106,804 | A | 4/1992 | Bailly et al. |
| 5,106,805 | A | 4/1992 | Bailly et al. |
| 5,208,109 | A * | 5/1993 | Bailly .................... C08F 10/00 428/402 |
| 5,317,036 | A | 5/1994 | Brady, III et al. |
| 5,352,749 | A | 10/1994 | DeChellis et al. |
| 5,405,922 | A | 4/1995 | DeChellis et al. |
| 5,436,304 | A | 7/1995 | Griffin et al. |
| 5,453,471 | A | 9/1995 | Bernier et al. |
| 5,462,999 | A | 10/1995 | Griffin et al. |
| 5,616,661 | A | 4/1997 | Eisinger et al. |
| 5,668,228 | A | 9/1997 | Chinh et al. |
| 5,684,097 | A | 11/1997 | Palmroos et al. |
| 6,031,056 | A | 2/2000 | Friederichs et al. |
| 2008/0312391 | A1 * | 12/2008 | Kelly .................... C08F 210/16 526/124.7 |

FOREIGN PATENT DOCUMENTS

| | | |
|---|---|---|
| CA | 2036767 A1 | 9/1991 |
| CA | 2056081 A1 | 5/1992 |
| CA | 2092769 A1 | 9/1993 |

OTHER PUBLICATIONS

Particle & Feature Analysis with AztecFeature; Copyright Oxford Instruments plc, 2015, Downloaded from: https://www.oxford-instruments.com/OxfordInstruments/media/nanoanalysis/EDS/Solutions/FEATURE/Feature-Application-Note.pdf (May 31, 2017); pp. 1-8.

ASTM D 6474-99 (Reapproved 2006)—Standard Test Method for Determining Molecular Weight Distribution and Molecular Weight Averages of Polyolefins by High Temperature Gel Permeation Chromatography; ASTM International; 2006, pp. 1-6.

ASTM E 878-01—Standard Test Method for Determination of Titaniuim in Iron Ores and Related Materials by Diantipyrylmethane Ultraviolet Spectrometry; ASTM International; 2001; pp. 1-4.

ASTM D 6645-01—Standard Test Method for Methyl (Comonomer) Content in Polyethylene by Infrared Spectrophotometry; ASTM International; 2001; pp. 1-4.

ASTM D 1238-10—Standard Test Method for Melt Flow Rates of Thermoplastics by Extrusion Plastometer; ASTM International; 2010; pp. 1-15.

ASTM D 792-13—Standard Test Methods for Density and Specific Gravity (Relative Density) of Plastics by Displacement; ASTM International; 2013; pp. 1-6.

Chien, James C.W; Weber, Siegfried and Hu, Youliang; Magnesium Chloride Supported Catalysts for Olefin Polymerization. XIX. Titanium Oxidation States, Catalyst Deactivation, and active Site Structure; Journal of Polymer Science: Part A: Polymer Chemistry, vol. 27, 1989, pp. 1499-1514.

* cited by examiner

PROCESS FOR POLYMERIZATION USING DENSE AND SPHERICAL ZIEGLER-NATTA TYPE CATALYST

Disclosed herein are processes for producing an ethylene polymer or copolymer characterized by low residual titanium and high bulk density using a dense and spherical Ziegler-Natta type catalyst comprising a titanium compound, an aluminum compound, and a dense and spherical magnesium support.

The use of Ziegler-Natta catalysts supported on spherical magnesium chloride in a process for the polymerization of ethylene is well known. The prior art processes include, but are not limited to, a precipitation reaction for both preparation of the spherical magnesium support and for impregnation of the support with the aluminum compound and the transition metal, and may also include the additional step of activation of the support with an alcohol or other labile hydrogen containing compound prior to impregnation with the aluminum compound and transition metal. Prior art processes for gas phase polymerization using high activity catalysts of this type also describe a prepolymerization step to create a prepolymerization catalyst that resembles the spherical catalyst in shape.

Processes for preparing a Ziegler-Natta type catalyst based on precipitation of titanium and possibly vanadium onto a spheroidal magnesium chloride support previously treated with an electron donor containing a labile hydrogen and comprising an organometallic reducing agent are known and described elsewhere. Treatment of the support with an electron donor containing a labile hydrogen permits incorporation of larger quantities of an organometallic reducing agent into the support which is necessary for the subsequent reduction of titanium, and possibly vanadium, to a lower valence state prior to polymerization. Ethylene polymers and copolymers produced with this catalyst are in the form of a powder containing spheroidal and non-adhesive particles that has good flow properties and is easy to handle.

Two-step processes for gas phase polymerization using a spherical Ziegler-Natta type catalyst resulting in a polymer that is also spherical and contains low residual transition metal are known and described elsewhere. In those disclosures, the first step is used to limit entrainment of particles outside of the fluidized bed by creating a prepolymer, as opposed to using a reactor with a particle release zone accompanied by lower speed of fluidization.

We have found that a highly active spherical Ziegler-Natta type titanium catalyst can be produced without the need for activation of the support by alcohol or other labile hydrogen containing compound. In some embodiments, the catalyst contains a high degree of titanium in the valence state of three and can be used in limited quantities in a one-step, or optionally a two-step process to yield a polyethylene resin with high bulk density and residual titanium lower than 5 ppm.

Provided is a process for polymerization of ethylene and optionally one or more alpha-olefins to produce an ethylene polymer or copolymer having a bulk density in granular form of greater than 22.5 lb/ft³ and residual titanium metal content of lower than 5 ppm, said process comprising contacting a Ziegler-Natta type catalyst with ethylene and optionally one or more alpha-olefins in a polymerization reactor, wherein said Ziegler-Natta type catalyst has a particle size distribution characterized by a Dm*/Dn of less than 3.0, and comprises: a titanium metal compound, an organoaluminum compound, and a spheroidal magnesium support, wherein at least 80% of said titanium metal compound is in the $Ti^{3+}$ valence state and the magnesium support comprises particles with a mass average diameter Dm of 5 to 100 μm and a particle size distribution characterized by a Dm/Dn of less than 3.0.

Provided is a spheroidal Ziegler-Natta type polymerization catalyst having a particle size distribution characterized by a Dm*/Dn of less than 3.0, wherein said catalyst comprises: a titanium compound, an organoaluminum compound, and a spheroidal magnesium support, wherein at least 80% of said titanium metal compound is in the $Ti^{3+}$ valence state and the magnesium chloride support comprises particles with a mass average diameter Dm of 5 to 100 μm and a particle size distribution characterized by a Dm/Dn of less than 3.0.

Provided is a method of making a spheroidal olefin Ziegler-Natta type polymerization catalyst having a particle size distribution characterized by a Dm*/Dn of less than 3.0, wherein said method comprises: i) combining a dialkylmagnesium compound with an ether; ii) combining the product of step i) with a source of chloride; iii) combining the product of step ii) with an organoaluminum compound; iv) combining the product of step iii) with a titanium metal compound.

Provided is a spheroidal Ziegler-Natta type prepolymerization catalyst having a particle size distribution characterized by a Dm*/Dn of less than 3.0, wherein said prepolymerization catalyst comprises: a copolymer of ethylene with up to 10% by weight of at least one alpha-olefin or a polymer of propylene and an active spheroidal Ziegler-Natta type catalyst comprising a titanium metal compound, an organoaluminum compound, and a spheroidal magnesium chloride support, wherein at least 80% of said titanium metal compound is in the $Ti^{3+}$ valence state and the magnesium chloride support comprises particles with a mass average diameter Dm of 5 to 100 μm and a particle size distribution characterized by a Dm/Dn of less than 3.0.

In some embodiments, a process for producing ethylene copolymers using a spheroidal Ziegler-Natta type catalyst supported on spheroidal magnesium chloride particles is provided. The resulting polymers, in granular form, have a high bulk density and contain minimal residual titanium from the catalyst.

By the term "spheroidal" it is meant that the particles, the catalyst, or the prepolymerization catalyst will have a spheroidal shape defined by the fact that the long axis D of the particle, catalyst, or prepolymerizaton catalyst divided by the short axis d of the particles, catalyst, or prepolymerization catalyst is ≤1.5, or ≤1.3, or when viewed under a stereomicroscope has a generally spherical shape or when viewed with a scanning electron microscope (SEM) has a generally spherical shape.

By the term "granular form", it is meant the state of produced copolymers immediately upon exiting the reactor and prior to extrusion.

In some embodiments, this disclosure provides for the polymerization of ethylene with at least one alpha-olefin, using a spheroidal Ziegler-Natta type catalyst supported on spheroidal magnesium chloride particles.

Olefin polymerization processes which are compatible with the current invention include gas phase and slurry phase polymerization processes.

In an embodiment of the invention, ethylene copolymerization with an alpha-olefin is carried out in the gas phase, in, for example, a fluidized bed reactor.

In an embodiment of the invention, ethylene copolymerization with an alpha-olefin is carried out in the slurry phase, for example, in a slurry phase loop or continuously stirred reactor.

Gas phase processes carried out in a fluidized bed reactor are widely described in the literature. In general, a fluidized bed gas phase polymerization reactor employs a "bed" of polymer and catalyst which is fluidized by a flow of monomer and other optional components which are at least partially gaseous. Heat is generated by the enthalpy of polymerization of the monomer (and optional comonomer(s)) flowing through the bed. Un-reacted monomer, comonomer(s), and other optional gaseous components exit the fluidized bed and are contacted with a cooling system to remove this heat. The cooled gas stream, including monomer, comonomer(s), and optional other components (such as condensable liquids), is then re-circulated through the polymerization zone, together with "make-up" monomer and comonomer(s) to replace that which was polymerized on the previous pass. Simultaneously, polymer product is withdrawn from the reactor. As will be appreciated by those skilled in the art, the "fluidized" nature of the polymerization bed helps to evenly distribute/mix the heat of reaction and thereby minimize the formation of localized temperature gradients.

The reactor pressure in a gas phase process may vary from about atmospheric to about 600 psig. In another embodiment, the pressure can range from about 100 psig (690 kPa) to about 500 psig (3448 kPa). In yet another embodiment, the pressure can range from about 200 psig (1379 kPa) to about 400 psig (2759 kPa). In still another embodiment, the pressure can range from about 250 psig (1724 kPa) to about 350 psig (2414 kPa).

The reactor temperature in a gas phase process may vary according to the heat of polymerization as described above. In a specific embodiment, the reactor temperature can be from about 30° C. to about 130° C. In another specific embodiment, the reactor temperature can be from about 60° C. to about 120° C. In yet another specific embodiment, the reactor temperature can be from about 70° C. to about 110° C. In still yet another specific embodiment, the temperature of a gas phase process can be from about 70° C. to about 100° C.

The fluidized bed process described above is well adapted for the preparation of polyethylene and ethylene copolymers. Hence, monomers and comonomers include ethylene and $C_{3-12}$ alpha olefins which are unsubstituted or substituted by up to two $C_{1-6}$ hydrocarbyl radicals; $C_{8-12}$ vinyl aromatic olefins which are unsubstituted or substituted by up to two substituents selected from $C_{1-4}$ hydrocarbyl radicals; and $C_{4-12}$ straight chained or cyclic diolefins which are unsubstituted or substituted by a $C_{1-4}$ hydrocarbyl radical. Illustrative non-limiting examples of alpha-olefins that may be copolymerized with ethylene include one or more of propylene, 1-butene, 1-pentene, 4-methyl-1-pentene, 1-hexene, 1-octene, and 1-decene, styrene, alpha methyl styrene, p-t-butyl styrene, and the constrained-ring cyclic olefins such as cyclobutene, cyclopentene, dicyclopentadiene norbornene, hydrocarbyl-substituted norbornenes, alkenyl-substituted norbornenes and the like (e.g., 5-methylene-2-norbornene and 5-ethylidene-2-norbornene, bicyclo-(2,2,1)-hepta-2,5-diene).

Detailed descriptions of slurry polymerization processes are widely reported in the patent literature. For example, particle form polymerization, or a slurry process where the temperature is kept below the temperature at which the polymer goes into solution is described in U.S. Pat. No. 3,248,179. Slurry processes include those employing a loop reactor and those utilizing a single stirred reactor or a plurality of stirred reactors in series, parallel, or combinations thereof. Non-limiting examples of slurry processes include continuous loop or stirred tank processes.

Slurry processes are conducted in the presence of a hydrocarbon diluent such as an alkane (including isoalkanes), an aromatic or a cycloalkane. The diluent may also be the alpha olefin comonomer used in copolymerizations. Alkane diluents include propane, butanes, (i.e., normal butane and/or isobutane), pentanes, hexanes, heptanes and octanes. The monomers may be soluble in (or miscible with) the diluent, but the polymer is not (under polymerization conditions). The polymerization temperature is, for example, from about 5° C. to about 200° C., or, for example, less than about 120° C., for example, from about 10° C. to about 100° C. The reaction temperature is selected so that an ethylene copolymer is produced in the form of solid particles. The reaction pressure is influenced by the choice of diluent and reaction temperature. For example, pressures may range from 15 to 45 atmospheres (about 220 to 660 psi or about 1500 to about 4600 kPa) when isobutane is used as diluent to approximately twice that (i.e., from 30 to 90 atmospheres—about 440 to 1300 psi or about 3000-9100 kPa) when propane is used. The pressure in a slurry process must be kept sufficiently high to keep at least part of the ethylene monomer in the liquid phase. The reaction typically takes place in a jacketed closed loop reactor having an internal stirrer (e.g., an impeller) and at least one settling leg. Catalyst, monomers, comonomer(s), and diluents are fed to the reactor as liquids or suspensions. The slurry circulates through the reactor and the jacket is used to control the temperature of the reactor. Through a series of let down valves the slurry enters a settling leg and then is let down in pressure to flash the diluent and unreacted monomers and comonomer(s), and recover the polymer generally in a cyclone. The diluent and unreacted monomers and comonomer(s) are recovered and recycled back to the reactor.

In an embodiment, a polymerization process involving the polymerization of ethylene and one or more comonomer(s)

having from 3 to 30 carbon atoms, or from 3-12 carbon atoms, or from 4 to 8 carbon atoms is provided. In some embodiments the process is particularly well suited to copolymerization reactions involving polymerization of ethylene in combination with one or more of the comonomers, for example, the alpha-olefins: propylene, 1-butene, 1-pentene, 4-methyl-1-pentene, 1-hexene, 1-octene, 1-decene, styrene and cyclic and polycyclic olefins such as cyclopentene, norbornene and cyclohexene or a combination thereof. Other comonomers for use with ethylene can include polar vinyl monomers, diolefins such as 1,3-butadiene, 1,4-pentadiene, 1,4-hexadiene, 1,5-hexadiene, norbornadiene, and other unsaturated monomers including acetylene and aldehyde monomers. Higher alpha-olefins and polyenes or macromers can be used also. In some embodiments, the comonomer is an alpha-olefin having from 3 to 15 carbon atoms, or, for example, 4 to 12 carbon atoms, or for example, 4 to 10 carbon atoms.

In an embodiment of the present invention, ethylene is copolymerized with an alpha olefin having from 3-10 carbon atoms and ethylene makes up at least 75 wt % of the total olefin feed entering the reactor.

In an embodiment of the present invention, ethylene is copolymerized with an alpha olefin having from 3-10 carbon atoms and ethylene makes up at least 85 wt % of the total olefin feed entering the reactor.

In embodiments of the present invention, ethylene is copolymerized with propylene, 1-butene, 1-hexene or 1-octene.

In an embodiment of the present invention, ethylene is copolymerized with 1-butene and ethylene makes up at least 75 weight % (i.e., wt %) of the total olefin feed entering the reactor.

In an embodiment of the present invention, ethylene is copolymerized with 1-hexene and ethylene makes up at least 75 wt % of the total olefin feed entering the reactor.

In an embodiment of the present invention, ethylene is copolymerized with 1-hexene and ethylene makes up at least 85 wt % of the total olefin feed entering the reactor.

In some embodiments, the object of the invention is to produce a large amount of polymer using a minimal amount of catalyst. The success of the invention may be measured by assessing the bulk density of polymer produced and the amount of residual titanium metal within the polymer. In a specific embodiment of the invention the residual titanium metal content of the resulting polymer is below 5 ppm. In another embodiment of the invention, the residual titanium metal content in the polymer is below 2.5 ppm. In further embodiments of the invention the residual titanium metal content in the polymer is below 0.75 ppm.

In an embodiment of the invention, the resulting polymer, in granular form, is greater than 22.5 lbs/ft$^3$. In another embodiment of the invention, the resulting polymer, in granular form, is greater than 23 lbs/ft$^3$. In further embodiments of the invention, the resulting polymer, in granular form, is greater than 24 lbs/ft$^3$.

The solid, spheroidal catalyst used for the present invention comprises a titanium metal compound, an organoaluminum compound and a spheroidal magnesium chloride support.

The solid catalyst is comprised of spheroidal particles with a particle size distribution characterized by a Dm*/Dn of ≤3.0, where Dm* is the "relative" mass average diameter of the catalyst particles and Dn is the number average diameter of the catalyst particles.

In an embodiment of the invention, the spheroidal catalyst particles have a Dm*/Dn of 3.0 or less.

In an embodiment of the invention, the spheroidal catalyst particles have a mass average diameter, Dm, of from 5 to 100 micrometers (μm).

In an embodiment of the invention, the support consists essentially of magnesium chloride, wherein the magnesium chloride is in the form of spheroidal particles having a mass average diameter Dm of between 10 and 100 μm and a particle size distribution, defined as the mass average diameter, Dm over the number average diameter, Dn of ≤3.0. Such spheroidal magnesium chloride supports as well as their preparation are known in the art. The magnesium chloride support may also contain small amounts of chloride containing aluminum compounds, such as for example, trichloroaluminum, and Grignard moieties, or compounds having Mg-carbon bonds.

The spheroidal magnesium chloride ($MgCl_2$) support is generally prepared by reacting a dialkylmagnesium compound with an organic chloride compound in the presence of a suitable electron-donating compound. Hence, during the formation of the magnesium chloride support an electron-donor compound should be present to induce the formation of a spheroidal magnesium chloride support. In some embodiments, the electron-donor compound is chosen from electron-donor compounds having moieties or functional groups which will not react with a diorganomagnesium compound's Mg-carbon bonds. Hence, in some embodiments, electron donor compounds such as water, alcohols, and phenols, are preferably avoided.

Without wishing to be bound by theory, the electron donor compound is believed to act as a complexing agent and not as a reactant, and helps the $MgCl_2$ particles form in a highly spheroidal and uniform shape. Also, during addition of the organaluminum and titanium metal compounds to the spheroidal support, the electron donor acts by complexing with the organoaluminum compound prior to addition of the titanium compound, lowering the reduction effect of the organoaluminum compound on the titanium metal compound.

The diorganomagnesium compound may be a dihydrocarbylmagnesium such as dialkylmagnesium or diarylmagnesium.

In an embodiment of the invention, a diorganomagnesium compound has the general formula $MgR^aR^b$ where $R^a$ and $R^b$ are each independently selected from $C_1$ to $C_{20}$ hydrocarbyl groups. In another embodiment of the invention, a diorganomagnesium compound has the general formula $MgR^aR^b$ where $R^a$ and $R^b$ are each independently selected from $C_1$ to $C_8$ hydrocarbyl groups.

Suitable dialkylmagnesium compounds include dibutylmagnesium (e.g., di-n-butylmagnesium), diisopropylmagnesium, dihexylmagnesium (e.g., di-n-hexylmagnesium), diethylmagnesium, propylbutylmagnesium (e.g., n-propyl-n-butylmagnesium), butylethylmagnesium (e.g., n-butylethylmagnesium) and other compounds having the general formula $MgR^aR^b$ where $R^a$ and $R^b$ are each independently selected from $C_1$ to $C_8$ linear or branched alkyl groups.

Diarylmagnesium compounds include for example diphenylmagnesium, and ditolylmagnesium.

Diorganomagnesium compounds having alkyl aryl groups are also contemplated for use with the current invention and include for example dibenzylmagnesium.

In cases where the diorganomagnesium compound is not readily soluble in the diluents of choice for the catalyst preparation, it may be desirable to add a solubilizing compound such as an organoaluminum or organozinc compound prior to use. Alternatively, where diorganomagnesium compounds provide solutions which are overly viscous in diluents of choice, solubilizers such as organoaluminum or organozinc may be used to decrease the viscosity of the solution.

In an embodiment of the invention, the diorganomagnesium compounds are treated with a solubilizing agent (or viscosity improving agent) and are formulated as solutions in a suitable hydrocarbon solvent. Such solutions are commercially available from suppliers such as Albermarle, Akzo Nobel, etc. For example, diorganomagnesium compounds available in hydrocarbon solution include solutions of butylethylmagnesium or dibutylmagnesium which have been treated with an organoaluminum compound to improve solubility and/or reduce solution viscosity.

The organic chloride compound is not specifically defined and can be any suitable organic chloride compound, which is capable of providing an active (i.e., reactive) chloride ion for reaction with an organomagnesium bond. In some embodiments, the chloride source will react spontaneously and fully with the diorganomagnesium compound, but a chloride source which requires a transfer agent is also contemplated for use with the current invention.

In an embodiment of the invention, the organic chloride compound will be an alkyl chloride having the formula $R^cCl$, wherein $R^c$ is a $C_3$ to $C_{12}$ secondary or tertiary alkyl group.

In an embodiment of the invention, the molar ratio of the organic chloride compound to the diorganomagnesium compound used during the preparation of the spheroidal magnesium chloride support is from 1.5 to 2.5.

In embodiments of the invention, the electron donor compound is selected from esters, thioethers, esters, sulfones, sulfoxides, secondary amides, tertiary amines, tertiary phosphines and phosphoramides.

In an embodiment of the invention, the electron-donor compound is an organic electron donor compound (also known as a Lewis basic compound).

In an embodiment of the invention, the electron-donor compound is an organic electron donor compound (also known as a Lewis basic compound) and is optionally free of reactive hydrogen (i.e., "non-protic" or "aprotic").

In an embodiment of the invention, the electron-donor compound is an organic electron donor compound (also known as a Lewis basic compound) and is free of reactive hydrogen (i.e., "non-protic" or "aprotic").

In an embodiment of the invention, the electron-donor compound is a non-protic organic electron donor compound.

In an embodiment of the invention, the electron-donor compound is a non-protic ether compound.

In an embodiment of the invention, the electron donor compound has low complexing power, such as a cyclic or non-cyclic ether compound.

In an embodiment of the invention, the electron donor compound is a non-protic organic ether compound.

In an embodiment of the invention, the electron donor compound is a non-protic organic ether compound having the formula $R^{10}OR^{11}$, where R w and $R^{11}$ are the same or different alkyl groups having from 1 to 12 carbons atoms.

In an embodiment of the invention, the electron donor compound is diisoamyl ether.

In an embodiment of the invention, the molar ratio of the electronic donor compound to the diorganomagnesium compound used during the preparation of the spheroidal magnesium chloride support is from 0.01 to 2. In further embodiments of the invention, the molar ratio of the electronic donor compound to the diorganomagnesium compound used during the preparation of the spheroidal magnesium chloride support is from 0.01 to 1.5, or from 0.1 to 1.5, or from 0.1 to 1.2, or from 0.2 to 0.8.

In an embodiment of the invention, the formation of the spheroidal magnesium chloride support is carried out at a temperature between 0° C. and 100° C., or at a temperature between 5° C. and 80° C.

In some embodiments, the reaction between the diorganomagnesium compound and the organic chloride compound in the presence of the electron donor compound is carried out in an inert liquid in which the resulting magnesium chloride support is insoluble. Hence the reaction is a precipitation reaction. Suitable inert liquids are liquid hydrocarbons.

In an embodiment of the invention, the spheroidal magnesium chloride (i.e., $MgCl_2$) support particles have a mass average diameter Dm of from 5 to 100 micrometers (µm), or any narrower range within this range. In an embodiment of the invention, the spheroidal magnesium chloride support particles have a Dm of from 5 to 75 µm. In another embodiment of the invention, the spheroidal magnesium chloride support particles have a Dm of from 5 to 50 µm. In further embodiments of the invention, the spheroidal magnesium chloride support particles have a Dm of from 5 to 40 µm, or from 5 to 30 µm, or from 5 to 25 µm, or from 10 to 50 µm, or from 10 to 40 µm, or from 10 to 30 µm.

In an embodiment of the invention, spheroidal $MgCl_2$ support particles have a particle size distribution characterized by a Dm/Dn of ≤3.0, where Dm is the mass average diameter of the support particles and Dn is the number average diameter of the support particles.

In an embodiment of the invention, the spheroidal $MgCl_2$ support particles have a Dm/Dn of 2.5 or less. In an embodiment of the invention, the spheroidal $MgCl_2$ support particles have a Dm/Dn of 2.0 or less. In an embodiment of the invention, the spheroidal $MgCl_2$ support particles have a Dm/Dn or 1.5 or less. In further embodiments of the invention, the spheroidal $MgCl_2$ support particles have a Dm/Dn of from 1.0 to 3.0, or from 1.0 to 2.75, or from 1.0 to 2.5, or from 1.0 to 2.0, or from 1.0 to 1.5.

In the present invention, the traditional Ziegler Natta catalyst components, for example a titanium metal compound and an organoaluminum compound, are added to the spheroidal magnesium chloride support in an inert liquid. Suitable inert liquids are liquid hydrocarbons.

In an embodiment of the invention, the transition metal compound has the formula: $Ti(OR^1)_aX_b$, where each $R^1$ is independently selected from $C_{1-4}$ alkyl radicals and $C_{6-10}$ aromatic radicals, X is selected from a chlorine atom and a bromine atom, a is an integer from 0 to 4, b is an integer from 0 to 4 and the sum of a+b is the valence of the Ti atom.

The reduction of the titanium metal compound to lower valence states is achieved by contact with the organoaluminum compound. Titanium metal compounds in the two or four valence state are not suitable for the catalyst of the present invention. Due to the organoaluminum compound, the titanium metal compound, when added, will be reduced, to varying degrees, to a lower valence state. In an embodiment of the invention the titanium metal compound prior to addition is the valence state of four.

In an embodiment of the invention the titanium metal compound is titanium tetrachloride.

In an embodiment of the invention the aluminum compound has the formula: $R^2_cAl(OR^2)_dX_{3-(c+d)}$ wherein each $R^2$ is the same or different $C_{1-10}$ alkyl radical, X is a chlorine atom, c is an integer from 0 to 3, d is an integer from 0 to 3 and the sum of a+b is from 0 to 3.

In an embodiment of the invention, the aluminum compound is selected from trimethyl aluminum, triethyl aluminum, diethyl aluminum ethoxide, diisobutyl aluminum ethoxide, triisobutyl aluminum, triisoprenyl aluminum, tri-n-hexyl aluminum, tri-n-octyl aluminum, diethyl aluminum chloride and mixtures thereof.

In some embodiments, the Ziegler-Natta type olefin polymerization catalyst may be prepared by reacting the spheroidal magnesium support with an organoaluminum compound followed by a titanium metal compound. In an embodiment of the invention the spheroidal magnesium chloride support is contacted, in an inert liquid in which the magnesium chloride support is insoluble, with the organoaluminum compound, followed by contact with the titanium metal compound. The mixture is subjected to stirring or mixing for at least thirty minutes. The resulting catalyst is washed, isolated, and dried.

EXAMPLES

Reagents

Dibutylmagnesium as a 1M solution in heptane was purchased from Sigma Aldrich. Upon arrival the bottles were transferred to the glovebox where it was stored under a nitrogen atmosphere in the freezer (at −30° C.). It was used as received.

Diisoamyl ether was purchased from Sigma Aldrich and transferred into the glovebox upon arrival. It was then stored in the freezer at −30° C. prior to use.

A drying reagent (Drierite™) was purchased from Sigma Aldrich. The drying reagent was conditioned before use by baking it in a muffle furnace set to 260° C. for a period of 16 hours. The drying reagent contained no indicator.

2-chloro-2-methylpropane (tert-butyl chloride or tBuCl) was purchased from Sigma Aldrich. The tBuCl was dried by placing it over the pre-dried drying reagent under an inert environment for approximately 16 hours at a ratio of 30 g of drying reagent per 100 mL of tBuCl. The flask containing the tBuCl was covered in foil to shield it from light during this process to minimize the formation of isobutylene. The dried tBuCl was further purified by vacuum transfer. The tBuCl moisture content was 12 ppm or less and had purity above 97% after purification. All glassware used in this procedure was dried in a 130° C. oven overnight.

Heptane was purchased from Sigma Aldrich and further purified using with alumina and molsieve columns. It was stored in the glovebox in Nalgene bottles containing 13× molecular sieves to dry (99.9% purity).

Triethylaluminum (TEAl) 25 wt % in hexane was purchased from Akzo Nobel and used directly from pyrosafe.

Diethylaluminum Ethoxide (DEAO), 25 wt % in heptane solution, was purchased from AkzoNobel. DEAD has a boiling point of 98° C. and a density of 0.684 g/mL.

Ethylene was purchased from Praxair as polymer grade. The ethylene was purified and dried by passing the gas through a series of purification beds including alumina (brand: Selexsorb COS), molecular sieve (type: 13X), and a deoxygenation bed (brand: Oxiclear®).

Purchased 1-hexene from Praxair was dried by storing a 1-liter batch over 3 A molecular sieves.

Titanium (IV) chloride ($TiCl_4$) was purchased from Sigma Aldrich as 99.9% purity packaged under nitrogen.

Analytical Measurements

Scanning Electron Microscope: For the examination of $MgCl_2$ particles, in order to obtain the mass average diameter (Dm) and the number average diameter (Dn), a number weighted particle size distribution was measured by electron microscopy via automated binary threshold particle recognition analysis. This analysis was performed with backscattered electron detected images obtained via a scanning electron microscope (SEM, manufacturer Hitachi "S-3400N II") equipped with an energy dispersive spectrometer (EDS, manufacturer Oxford Instruments "X-sight 450"). Oxford Instruments "INCA" software is capable of automated particle analysis via threshold particle acquisition, which is based on the principle that the particles or 'features' are recognized against a background matrix, forming a binary image where particles are recognized via a selected threshold signal level. The acquisition process is automated over a specified region where the particles have been applied to a suitable matrix (carbon tape) such that particle-to-particle touching is minimized so that particle recognition is primarily on discrete particles surrounded by the matrix background. During acquisition, both EDS spectra and particle morphological data are acquired simultaneously for both elemental composition and particle morphology for each recognized particle recorded. The conditions used for measurement were as follows: 20 kV, aperture 1, 10 mm working distance, probe current 50-70 setting, 700× magnification field-of-view, back scattered electron detector, with a minimum of 700 particles detected.

During post-acquisition, a morphological and compositional filter was applied to remove anomalous data (non $MgCl_2$ particles) by the following criteria: particle area 150≤x≤825 µm, aspect ratio 1≤x≤2.25, excluding particles detecting Fe, Ni, Cr. The particles passing through these filter criteria were used for analysis.

Stereomicroscope: A Carl Zeiss stereomicroscope Model #47 50 03-9901 adapted with a photographic camera was used for showing the spheroidal shape of the $MgCl_2$ support particles, the polymerization catalyst particles as well as the ethylene copolymer particles. All the polymerization catalyst and polymer particle spheroidal shapes and uniformities were determined by pictures taken from this instrument.

By obtaining by optical microscopy of a population of particles, such as a population of magnesium chloride particles, a table of absolute frequencies showing the number $n_i$ of particles belonging to each class i of diameters, where each class i is characterized by an intermediate diameter $d_i$, between the limits of each class, is obtained. Dm and Dn then are determined using the following equations: mean diameter by mass, $Dm=\Sigma n_i(d_i)^3 d_i/\Sigma n_i(d_i)^3$; mean diameter by number, $Dn=\Sigma n_i \, d_i/\Sigma n_i$. The ratio, Dm/Dn defines the particle size distribution, and is sometimes known as the "width of the particle size distribution." The particle size distribution can be also be characterized by taking a unit-less "relative mass average diameter" defined as Dm* over a number average diameter by number Dn, where the Dm* is obtained by visual examination of particle sizes of varying relative diameter and counting the number of particles in each particle diameter group. This allows a person skilled in the art to characterize the particle size distribution using optical equipment which does not provide an absolute value (e.g., in microns) for the mean diameter mass, Dm*.

Thermogravimetric analysis was coupled with Fourier transform infrared spectrometry to provide a weight loss profile and qualitative identification of the evolved gases as a sample is heated in an inert atmosphere (UHP nitrogen). The analytical instruments used are a TA Instruments SDT2960 thermal analyzer and a Bruker Tensor 27 FTIR spectrometer. The following temperature program was used for the thermal analysis: ramp at 5° C./minute to 115° C. and hold at 115° C. for 15 minutes; ramp at 10° C./minute to 200° C. and hold at 200° C. for 30 minutes. The weight loss during the ramp to 115° C. and the 115° C. hold time is usually attributable to the loss of the solvent used during the polymerization catalyst or $MgCl_2$ support preparation process. Examples of the typical solvents used are toluene, isoamyl ether, heptane, and THF. The weight loss during the ramp to 200° C. and the 200° C. hold time is attributable to the loss of further solvent. The lack of solvent in the evolved gas during this portion of the program is an indicator that all of the solvent had evolved during the first portion of the program.

Melt index, $I_2$, in g/10 min was determined on a Tinius Olsen Plastomer (Model MP993) in accordance with ASTM D1238 condition F at 190° C. with a 2.16 kilogram weight. Melt index, $I_{10}$, was determined in accordance with ASTM D1238 condition F at 190° C. with a 10 kilogram weight. High load melt index, $I_{21}$, in g/10 min was determined in accordance with ASTM D1238 condition E at 190° C. with a 21.6 kilogram weight.

Polymer density was determined in grams per cubic centimeter (g/cc) according to ASTM D792.

Molecular weight information (Mw, Mn and Mz in g/mol) and molecular weight distribution (Mw/Mn), and z-average molecular weight distribution (MZ/MW) were analyzed by gel permeation chromatography (GPC). Polymer sample solutions (1 to 2 mg/mL) were prepared by heating the copolymer in 1,2,4-trichlorobenzene (TCB) and rotating on a wheel for 4 hours at 150° C. in an oven. The antioxidant 2,6-di-tert-butyl-4-methylphenol (BHT) was added to the mixture in order to stabilize the polymer against oxidative degradation. The BHT concentration was 250 ppm. Sample solutions were chromatographed at 140° C. on a PL 220 high-temperature chromatography unit equipped with four Shodex columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect SEC columns from oxidative degradation. The sample injection volume was 200 mL. The SEC raw data were processed with the Cirrus GPC software. The SEC columns were calibrated with narrow distribution polystyrene standards. The polystyrene molecular weights were converted to polyethylene molecular weights using the Mark-Houwink equation, as described in the ASTM standard test method D6474.

The peak melting point ($T_m$) and percent of crystallinity of the polymers were determined by using a TA Instrument DSC Q1000 Thermal Analyser at 10° C./min. In a DSC measurement, a heating-cooling-heating cycle from room temperature to 200° C. or vice versa was applied to the polymers to minimize the thermo-mechanical history associated with them. The melting point and percent of crystallinity were determined by the primary peak temperature and the total area under the DSC curve, respectively, from the second heating data. The peak melting temperature $T_m$ is the higher temperature peak, when two peaks are presented in a bimodal DSC profile (typically also having the greatest peak height).

The branch frequency of the polyethylene polymer samples (i.e., the short chain branching, SCB per 1000 carbons) and the $C_6$ comonomer content (in wt %) was determined by Fourier Transform Infrared Spectroscopy (FTIR) as per the ASTM D6645-01 method. A Thermo-Nicolet 750 Magna-IR Spectrophotometer equipped with OMNIC version 7.2a software was used for the measurements.

The determination of branch frequency as a function of molecular weight (and hence the comonomer distribution profile) was carried out using high temperature Gel Permeation Chromatography (GPC) and FT-IR of the eluent. Polyethylene standards with a known branch content, polystyrene and hydrocarbons with a known molecular weight were used for calibration.

To determine $CDBI_{50}$, a solubility distribution curve is first generated for the copolymer. This is accomplished using data acquired from the TREF technique. This solubility distribution curve is a plot of the weight fraction of the copolymer that is solubilized as a function of temperature. This is converted to a cumulative distribution curve of weight fraction versus comonomer content, from which the $CDBI_{50}$ is determined by establishing the weight percentage of a copolymer sample that has a comonomer content within 50% of the median comonomer content on each side of the median. The weight percentage of a higher density fraction (i.e., the wt % eluting from 90-105° C.), is determined by calculating the area under the TREF curve at an elution temperature of from 90 to 105° C. The weight percent of copolymer eluting below 40° C. can be similarly determined. For the purpose of simplifying the correlation of composition with elution temperature, all fractions are assumed to have a Mn≥15,000, where Mn is the number average molecular weight of the fraction. Any low molecular weight fractions present generally represent a trivial portion of the polymer. The remainder of this description maintains this convention of assuming all fractions have Mn≥15,000 in the $CDBI_{50}$ measurement.

Temperature Rising Elution Fractionation (TREF) Method: Polymer samples (50 to 150 mg) were introduced into the reactor vessel of a crystallization-TREF unit (Polymer ChAR™). The reactor vessel was filled with 20 to 40 ml 1,2,4-trichlorobenzene (TCB), and heated to the desired dissolution temperature (e.g. 150° C.) for 1 to 3 hours. The solution (0.5 to 1.5 ml) was then loaded into the TREF column filled with stainless steel beads. After equilibration at a given stabilization temperature (e.g., 110° C.) for 30 to 45 minutes, the polymer solution was allowed to crystallize with a temperature drop from the stabilization temperature to 30° C. (0.1 or 0.2° C./minute). After equilibrating at 30° C. for 30 minutes, the crystallized sample was eluted with TCB (0.5 or 0.75 mL/minute) with a temperature ramp from 30° C. to the stabilization temperature (0.25 or 1.0° C./minute). The TREF column was cleaned at the end of the run for 30 minutes at the dissolution temperature. The data were processed using Polymer ChAR software, Excel spreadsheet and TREF software developed in-house.

The TREF procedure described above is well known to persons skilled in the art and can be used to determine: the overall TREF profile, $CDBI_{50}$, the polyethyelene polymer wt % represented at from 90° C. to 105° C.

Some catalyst samples were analyzed for titanium valence distribution. A redox titration method for titanium valence distribution was developed based on a scientific paper (J. C. W. Chien et. al, *J. Polym. Sci. Part A: Polym. Chem.* 1989, 27, 1499-1514) and an ultraviolet (UV) method for titanium content analysis was developed based on ASTM standard E878-01.

Preparation of Spheroidal $MgCl_2$ Support

Figure 1:
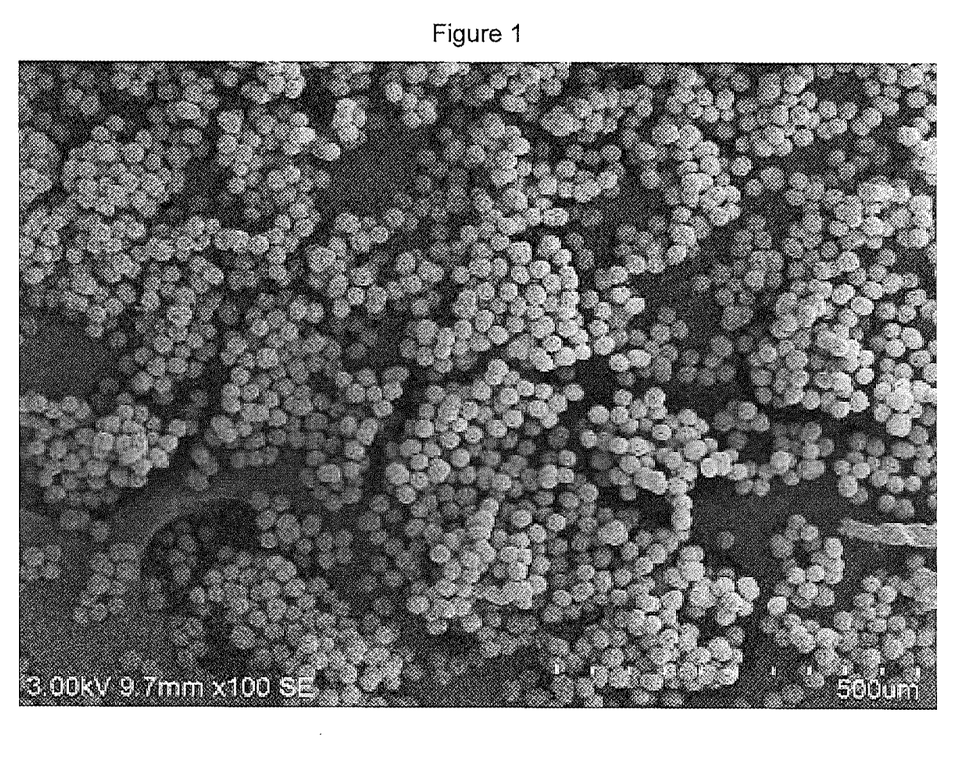
FIG. 1 shows an SEM micrograph of $MgCl_2$ support particles.

A bench scale reactor was used for the preparation of $MgCl_2$: a 2 L stirred Parr bench-scale reactor was used. The reactor was equipped with a mechanical stir capable of stirring to 1200 rpm. The jacketed reactor had a temperature control system to maintain the reactor temperature between 30 to 100° C. The reactor was equipped with a triple blade metal stirrer, baffles and pressurized to 5 psi nitrogen. The reactor was then charged with a 1M solution of dibutyl magnesium in heptane (417.5 mL, 417.5 mmol), diisoamyl ether (31.9 g, 201.2 mmol) and anhydrous heptane (275 mL). Stirring was started at 1191 rpm. Next, 2-methyl-2-chloropropane (115.7 g, 1250 mmol) in anhydrous heptane (125 mL) was added via syringe pump at a constant rate over 7 hours. After the addition was complete the mixture was stirred at 1191 rpm overnight. The white mixture was transferred out of the reactor to a glass vessel where the supernatant was decanted and the remaining white solids were washed six times with pentane and dried to 300 mTorr via vacuum. Yield=50.465 g. A scanning electron micrograph (SEM) of the magnesium support is provided in FIG. 1. FIG. 1 shows that the magnesium chloride support particles have a spheroidal shape. The magnesium chloride support particles have an average diameter in the range of 20 μm to 30 μm and a Dm/Dn value of 1.07 with Dm=28.4 μm and Dn=26.6.

For the $MgCl_2$ support particles, both the mass average diameter $D_m$ (by SEM) and the "relative" mass average diameter $D_m^*$ (by stereomicroscope) were obtained to provide a comparison of the methods. Based on SEM, 347 particles were counted. They were divided into 7 different classes with 5 micron intervals from 15 to 50 microns. $D_m$ and $D_n$ were calculated based on data in the Table 1A below. The results from Table 1A yield a Dm of 28.4 microns and a Dn of 26.6 microns. The resulting Dm/Dn value is 1.07.

TABLE 1A

| Diameter in microns (μm) | Lower limit in microns (μm) | Upper limit in microns (μm) | Count |
|---|---|---|---|
| 17.5 | 15 | 20 | 18 |
| 22.5 | 20 | 25 | 89 |
| 27.5 | 25 | 30 | 189 |
| 32.5 | 30 | 35 | 42 |
| 37.5 | 35 | 40 | 8 |
| 42.5 | 40 | 45 | 1 |
| 47.5 | 45 | 50 | 0 |

The picture obtained from the stereomicroscope showing the dense and spheroidal particles was enlarged for easy counting, so the units of Dm* are arbitrary and have no real meaning; the Dm* is a relative mass average diameter. Nevertheless, the particle size distribution characterized by Dm*/Dn showed similar results to the particle size distribution characterized as Dm/Dn and determined by SEM. With the stereomicroscope, a total of 166 particles were counted and Dm*/Dn=1.05. The classes in Table 1B represent different size categories for the counted particles.

TABLE 1B

| Class Code | Total | Size (mm) |
|---|---|---|
| Class 1 | 132 | 10 |
| Class 2 | 24 | 8 |
| Class 3 | 2 | 6 |
| Class 4 | 4 | 12 |
| Class 5 | 4 | 15 |

Thermogravimetric analysis (TGA) showed that the spheroidal $MgCl_2$ support contained 9.9% by weight of the diisoamyl ether compound.

Ether does not need to be removed for loading Ziegler catalysts.

Preparation of the Ziegler Natta catalyst

Figure 2:
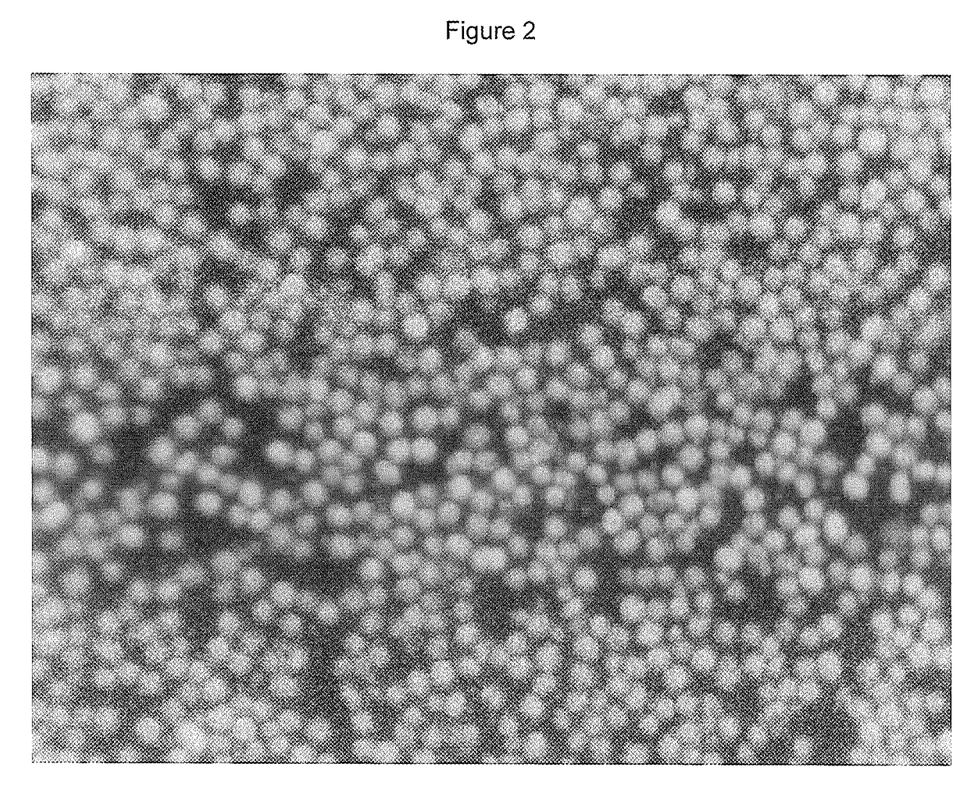
FIG. 2 shows stereomicroscope view of particles of Catalyst 1.

Catalyst 1 Magnesium chloride (3.00 g, 31.5 mmol) was weighed into ten 100 mL hypovials. Cyclohexane (55 mL) was added to each hypovial followed by diethylaluminum ethoxide (25 wt % in heptane, 4.375 g, 8.40 mmol). Each hypovial was capped and shaken at room temperature on an orbital surface shaker at 320 rpm for 30 minutes. Titanium (IV) chloride (0.797 g, 4.20 mmol) was diluted in cyclohexane (3 mL) and added dropwise to the reaction mixture. The resulting solution was then shaken on an orbital surface shaker at 320 rpm for 2 hours. The mixtures from the hypovials were then combined on a glass sintered filter frit, washed once with cyclohexane and three times with heptane and dried under vacuum to 300 mTorr. Total of 10 batches of the catalyst were made and combined as Catalyst 1. Dm*/Dn=1.05. See the FIG. 2 for the uniform spherical particle shape and size.

Catalyst 2

Magnesium chloride (3.00 g per vial, 31.5 mmol) was weighed into 100 mL hypovials. Cyclohexane (55 mL) was added to each hypovial followed by triethylaluminum (25 wt % in heptane, 0.690 g, 6.04 mmol). Each hypovial was capped and shaken at room temperature on an orbital surface shaker at 320 rpm for 30 minutes. Titanium (IV) chloride (0.096 g, 0.51 mmol) was diluted in cyclohexane (3 mL) and added dropwise to the reaction mixture resulting in a beige slurry. The resulting solution was then shaken on an orbital surface shaker at 320 rpm for 2 hours. The mixtures from the hypovials were then combined on a glass sintered filter frit, washed once with cyclohexane and three times with heptane and dried under vacuum to 300 mTorr.

Purified Armostat™ (2.998 g, 8.38 mmol) was slurried in anhydrous heptane (64.542 g). The solution was heated to 50° C. and stirred for 30 minutes, resulting in a cloudy, colorless 4.4 wt % Armostat™ solution.

Figure 3:
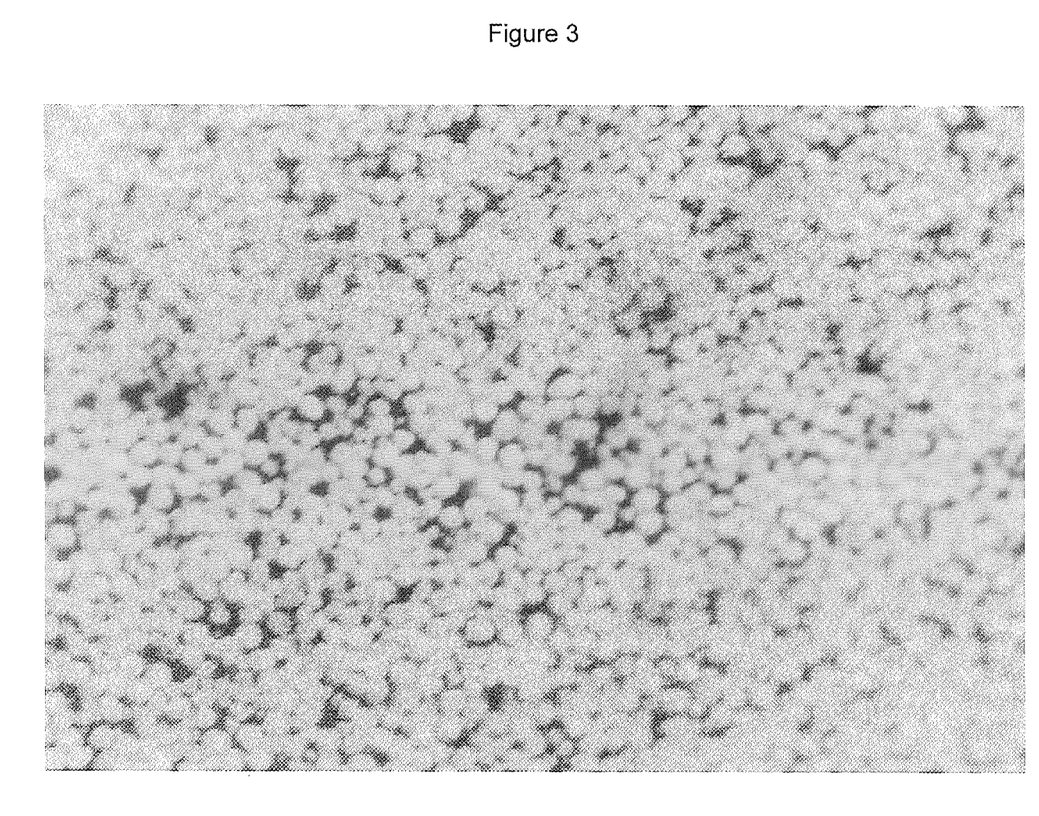
FIG. 3 shows stereomicroscope view of particles of Catalyst 2.

The golden brown solid (3.00 g per vial) was then weighed out into 100 mL hypovials and heptane (15 mL) was added to each. Armostat solution (1.748 g, 4.4 wt % in heptane) was added dropwise to each hypovial. Armostat is used to facilitate addition of the catalyst to the bench scale reactor as it prevents dried catalyst from dispersing aerially before injection. The slurry was then shaken for 2 hours at room temperature at 320 rpm. The mixtures from the hypovials were then combined in a round bottom flask and dried under vacuum to 300 mTorr resulting in a light tan powder. Total of 16 batches of the catalysts were made and combined as a master batch (Yield=47.138 g, Ti=0.915 wt %:Dm*/Dn=1.03). See FIG. 3 for uniform spherical particle shape and size.

Catalyst 3 (Pre-Polymerization Catalyst)

The polymerization reaction is sensitive to moisture and oxygen. Precautions are taken to ensure the reaction is in a very low moisture ($H_2O$) composition and very low oxygen composition level. The reactor's critical operational parts are inspected for proper tolerances and mechanical integrity to ensure that reliability is optimized prior to conducting experiment. The two-liter reaction vessel and associated internal surfaces are made of 316 stainless steel, Teflon O-rings, gaskets and bushings, which are parts found on the interior of the reactor providing support to a magnetically driven impeller shaft for stirring the slurry mixture at ~600 RPM. All interior reactor surfaces must be polished free of any previous polymer residue from prior reaction processes. Cleaning tools used to remove polymer residue and possible contaminants must be tools which are free of any oils and, where possible, be limited to use on a particular reactor unit. Cleaning materials employed include lint-free tissues, hair or polymer fibre brushes, metal brushes attached to a drill, solvent and alkyl aluminum in solvent solution (dilute TEAL). The reactor is closed and sealed and leak down tested prior to internal conditioning. The reactor must be purged with nitrogen several times to reduce the concentrations of both moisture and oxygen. Purified nitrogen is used to purge the reactor.

Figure 4:
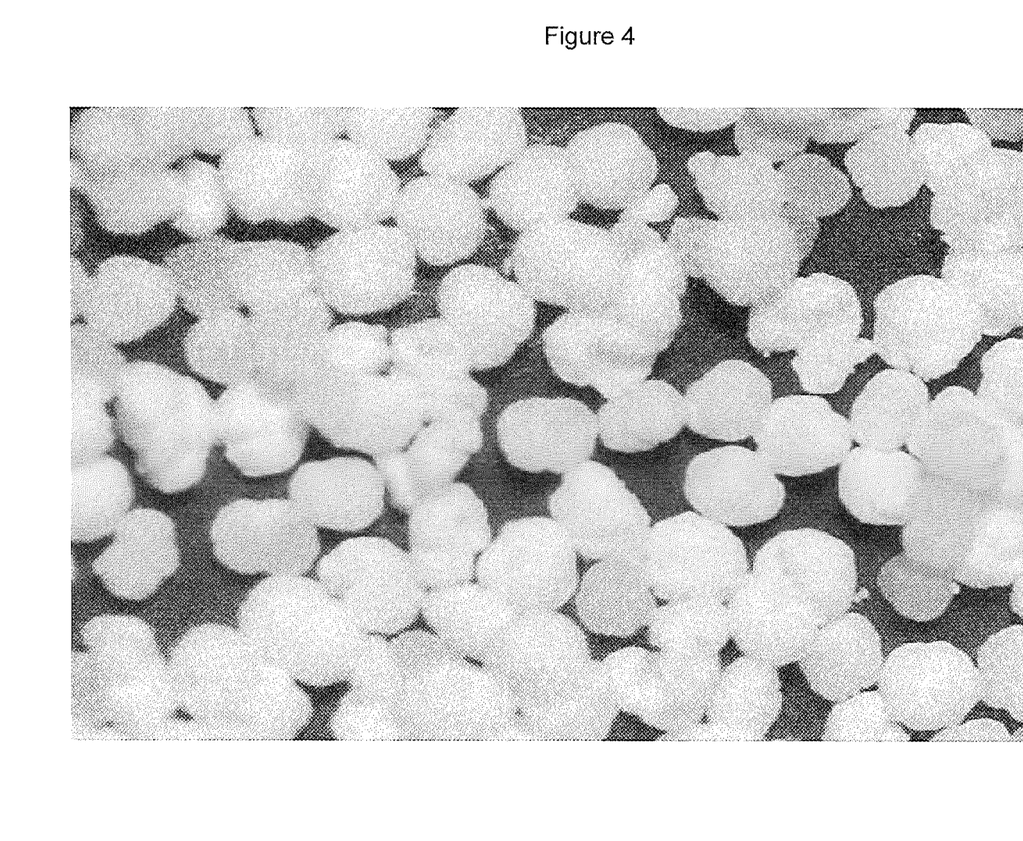
FIG. 4 shows stereomicroscope view of particles of Catalyst 3.

Conditioning:
  Purified pre-nitrogen purges=0-200 psig 3 times
  Reactor pre-Conditioning Temperature=105° C. under nitrogen for 80 min.
  Purified post-nitrogen purges=0-200 psig 3 times Operation conditions:
  Total Reactor Pressure=30-32 psig
  Reaction Temperature=25° C.
  Gas Composition 6% Ethylene (pp=2-4 psig) Nitrogen/Heptane balance (pp partial pressure=28 psig)
  Ethylene Mass Flow Controller set to 0.2 to 0.3 SLPM
  Comonomer control: Cascade Flow control of 1-Hexene to Ethylene ratio=8.7% (mol/mol)
  Total Liquids=0-1000 mL When the reactor is conditioned, at temperature and ready to be run, the slurry catalyst (Catalyst 1)/TEAL/heptane mixture was added to the reactor at 1 psi from a round bottomed septa closed flask to injection port 90HV13 with the assistance of a low pressure nitrogen feed. After a wash with heptane for quantitative complete transfer of the slurry catalyst the cannula was removed and 90HV13 closed. The reactor was pressurized to 28 psig with nitrogen. Ethylene was introduced to the reactor raising the pressure to 30 psig at 0.2-0.3 standard liters per minute (SLPM) with stirring and 1-hexene feed control was turned on at 8.7% feed ratio. The reaction was run at 25 to 30° C. for 248 minutes. Yield of prepolymerization catalyst was 30 g with a growth factor of 8 determined by Inductively Coupled Plasma-Mass Spectrometry (ICP-MS) analysis, using an Agilent 7700 series instrument, and showed a Dm*/Dn of 1.02. See FIG. 4 for the uniform spherical particle shape and size.

Comparative catalyst example was referenced from U.S. Pat. No. 7,211,535 example 1.

TABLE 2

Catalyst Composition

| Catalyst Code | Catalyst Formulation | Growth Factor for the Pre-Polymerization | Wt % of Ti | % Ti$^{3+}$ |
|---|---|---|---|---|
| Catalyst 2 | 7.5 MgCl$_2$ + 0.36 AlEt$_3$ + 0.1 2TiCl$_4$ + 2.5 wt % Armostat ™ | N/A | 0.914 | |
| Catalyst 3 | 7.5 MgCl$_2$ + 2.0 AlEt$_2$(OEt) + 1.0 TiCl$_4$ | 8 | 0.719 | 88.5 |
| Comparative Catalyst | | N/A | 0.470 | |

Polymerization

The Bench Scale Reactor (BSR) was a 2 liter autoclave semi batch reactor operating in the gas phase at 88° C. at 300 psig of total operating pressure. 1.0 mL of a 25 wt % solution of triisobutylaluminum (TIBAL) in heptane was used as an impurity scavenger prior to introduction of ethylene. Catalyst delivery and polymer removal were in batch mode, and all feed-streams delivery were continuous. The reactor was equipped with impeller stirrers that spin at 525 rpm to provide reactor mixing. The BSR was equipped with a process Gas Chromatograph that continuously measured the reactor headspace composition. A syringe pump delivered 1-hexene to the reactor and all other feed-streams were delivered via mass flow indicating controllers. The feed-streams responded to inputs from the master controller in a closed loop control system to maintain reaction set-points. Feed-stream control utilized cascaded proportional-integral-derivative (i.e. PID) loops for each of the reactor reagents (ethylene, 1-hexene, hydrogen and nitrogen). The operator entered the target mole % of each reagent into the Human Machine Interface. These values were what the primary or master loop utilized as the process set-point target and this was what the unit monitored via the feedback from the process GC analysis. The cascaded (slave) loop interpreted the output from the master loop as a molar ratio of the reagent concentration divided by ethylene concentration. This reagent molar ratio varied during the reaction in relation to the GC analysis output concentrations in the master loop and thereby maintained reagent set-points in the master loop.

Pressure control of the reactor was done by the use of a single PID loop where input to the loop was in the form of the observed reactor pressure. The loop output controlled the flow of only ethylene to the reactor to maintain the set pressure. As described above, all of the other reaction components were fed in ratio to the ethylene and were therefore subjected to the constraints of pressure control.

General Conditions: The reactor was heated at 100° C. for 1 hour and thoroughly purged with nitrogen. A polymerization catalyst (prepared as above) was loaded into a catalyst injection tube in an inert atmosphere glove box. The catalyst injection tube was attached to the reactor, and the reactor was purged once with ethylene and four times with nitrogen. Ethylene partial pressure was maintained at 50 mol % in the reactor. 1-Hexene partial pressure was maintained at 0.8 mol %. Hydrogen flow was adjusted to the ethylene flow such that the partial pressure was maintained at approximately 0.025 mol % and the balance of the reactor mixture (approximately 49 mol %) was nitrogen. The run was continued for 60 minutes, before the ethylene flow was stopped. Cooling water was turned on and the ethylene was slowly vented from the reactor. The reactor was then purged with nitrogen. The reactor was then opened so that the reactor contents, the reactor appearance and the polymer could be observed. The polymer was removed and then weighed. Polymer data are provided in Table 3 and Table 4.

TABLE 3

Polymer properties

Figure 5:
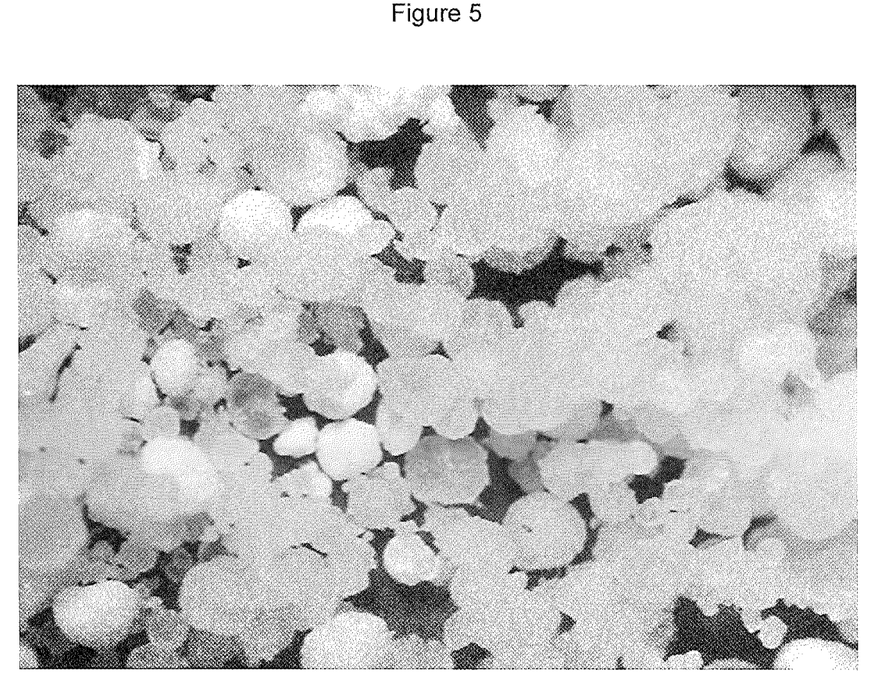
FIG. 5 shows stereomicroscope view of particles of polymer (comparative example) generated from a bench scale reactor.
Figure 6:
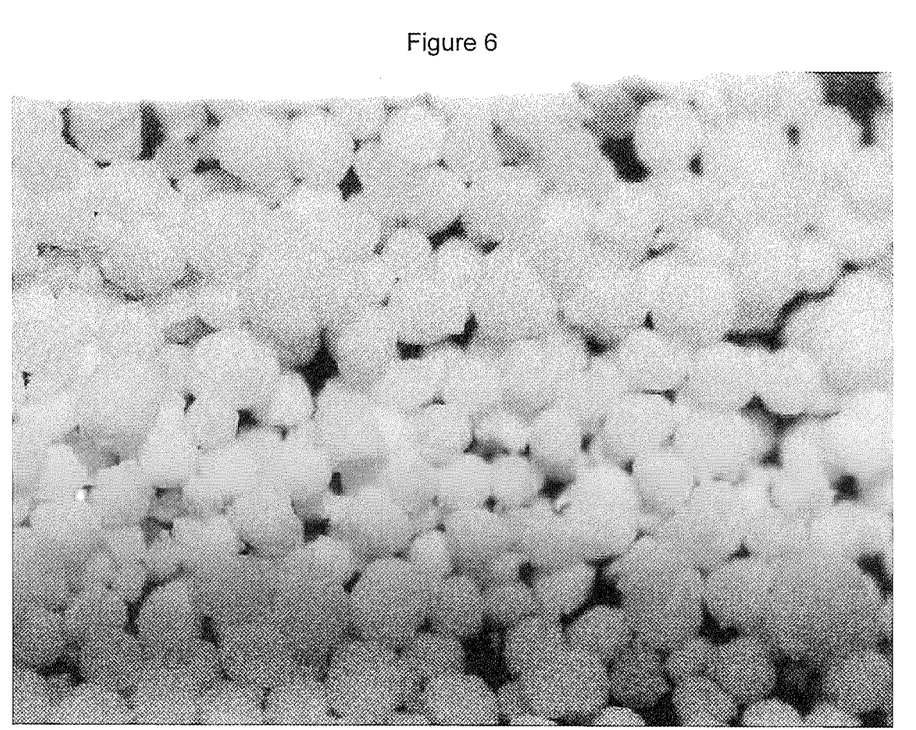
FIG. 6 shows stereomicroscope view of particles of polymer using Catalyst 2 generated from a bench scale reactor.
Figure 7:
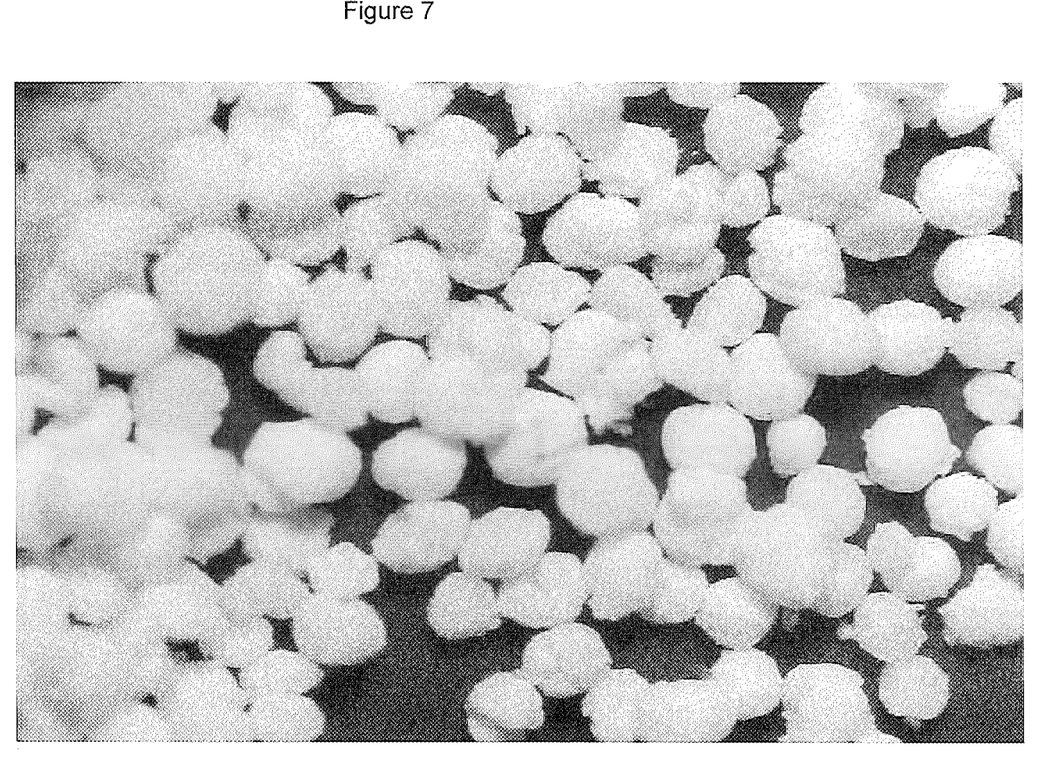
FIG. 7 shows stereomicroscope view of particles of polymer using Catalyst 3 generated from a bench scale reactor.

| Catalyst Class | Comparative Catalyst | Catalyst 2 | Catalyst 3 |
|---|---|---|---|
| Productivity* (g PE/g cat.) | 619 | 2100 | 1207 |
| H$_2$ mol % | 3.0 | 2.77 | 1.59 |
| C$_6$ mol % | 3.1 | 2.93 | 2.05 |
| MI (I$_2$) | 1.15 | 0.82 | 1.01 |
| Density (g/cm$^3$) | 0.9147 | 0.9151 | 0.9202 |
| MFR (I$_{21}$/I$_2$) | 36.8 | 31.3 | 41.9 |
| M$_w$ | 102831 | 100650 | 134195 |
| FTIR br/1000 C | 19 | 20.4 | 12 |
| PDI (M$_w$/M$_n$) | 3.92 | 3.74 | 3.65 |
| Microstructure uniformity (CDBI-50) | 35.5 | 30.4 | 54.8 |
| DSC | | | |
| Onset (° C.) | 117.9 | 119.6 | 118.8 |
| Melting (° C.) | 122.8 | 124.8 | 125.6 |
| Polymer morphology | FIG. 5 | FIG. 6 | FIG. 7 |
| Dm*/Dn | 1.12 | 1.01 | 1.03 |

Figure 8:
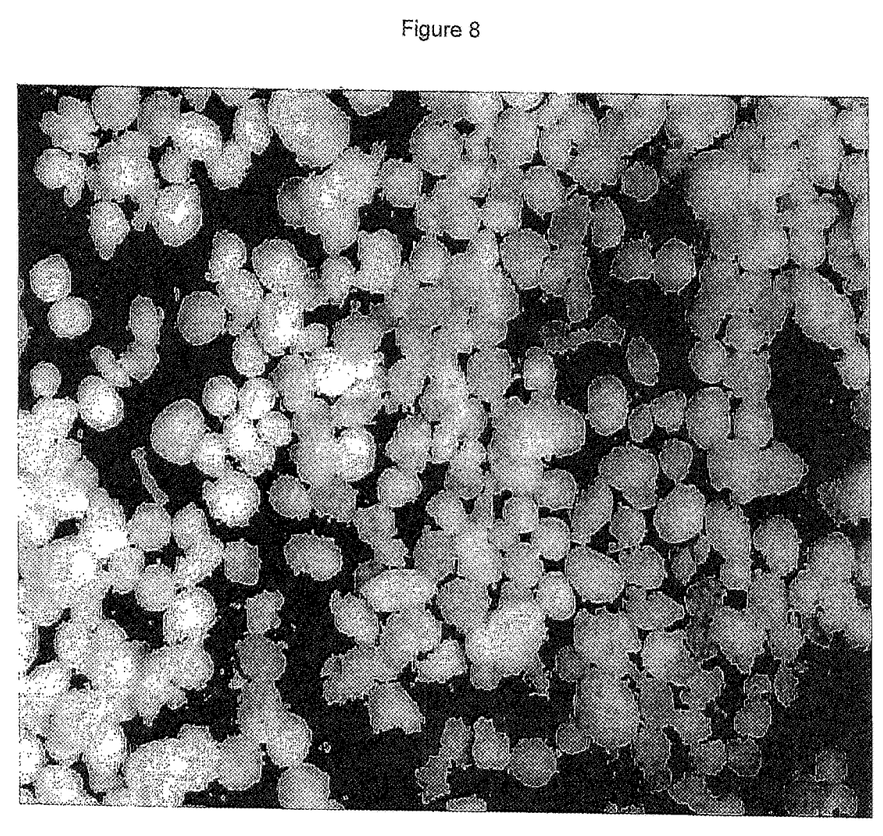
FIG. 8 shows stereomicroscope view of particles of polymer using Catalyst 2 generated from a Technical Scale Reactor.
Figure 9:
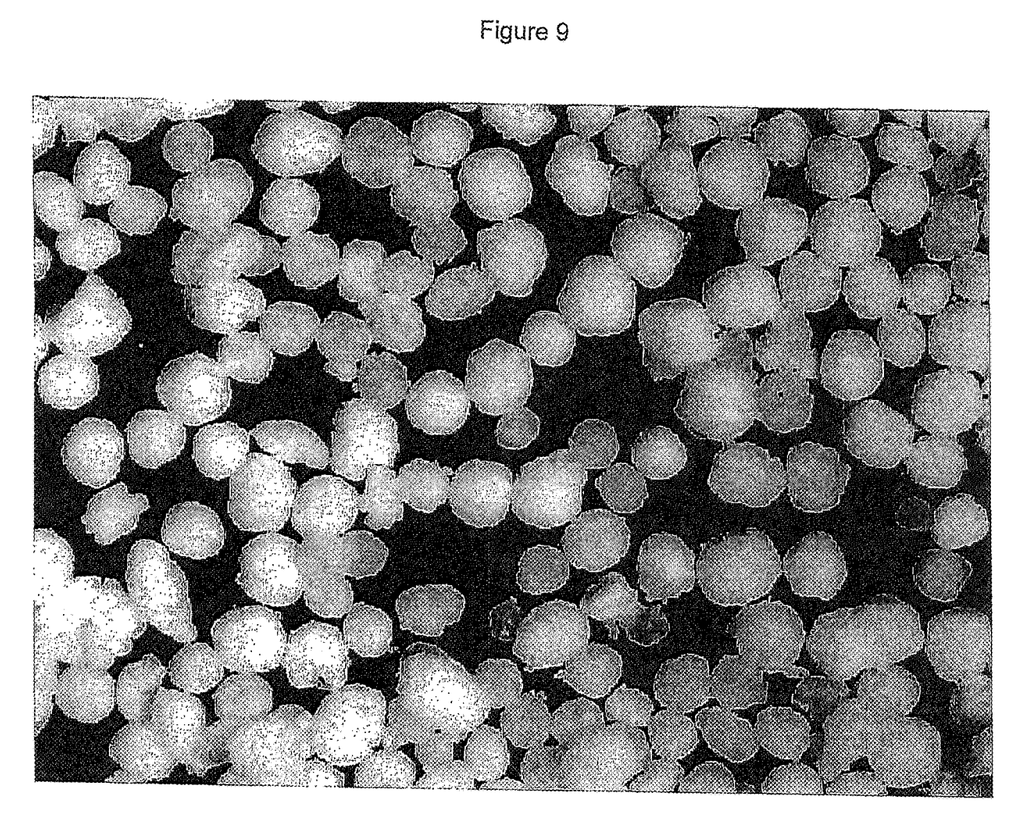
FIG. 9 shows stereomicroscope view of particles of polymer using Catalyst 3 generated from a Technical Scale Reactor.

Catalyst 2 and catalyst 3 were also evaluated on a technical scale reactor (TSR). The detailed description of TSR can be found in EP 659773 B2. Polymer morphology of these two resins can be found in FIGS. 8 and 9 with Dm*/Dn=1.03 and 1.06, respectively. Polymer produced on the TSR also showed a narrow size distribution. 90% of the polymer particles for run 5 was between 250 to 1000 microns.

TABLE 4

TSR Resin Properties: Bulk Density and Residual Ti (ppm)

| TSR Run# | Description | Bulk Density (lb/ft$^3$) | Ti (ppm) | Catalyst productivity (g/g) |
|---|---|---|---|---|
| 1 | Comparative Catalyst | 20.6 | 1.55 | 3061 |
| 2 | Catalyst 2 | 21.5 | 0.61 | 7134 |
| 3 | Catalyst 2 | 21.0 | 0.65 | |
| 4 | Catalyst 3 | 24.2 | 2.48 | 2832 |
| 5 | Catalyst 3 | 22.6 | 2.27 | |

What is claimed is:

1. A process for producing an ethylene polymer or copolymer which contains less than 2.5 ppm titanium and has a bulk density, in granular form, of at least 22.5 lbs/ft$^3$, said process comprising contacting, under polymerization conditions, ethylene and at least one alpha-olefin, and a spheroidal Ziegler-Natta type olefin polymerization catalyst having a particle size distribution characterized by a Dm*/Dn of less than 1.5 and a mass average diameter Dm of from 5 to 40 μm, wherein said catalyst comprises:
   i) a titanium metal compound that is introduced as a compound of the formula Ti(OR$^1$)$_a$X$_b$, where each R$^1$ is independently chosen from C$_{1-4}$ alkyl radicals and C$_{6-10}$ aromatic radicals, X is chosen from a chlorine atom and a bromine atom, a is an integer from 0 to 4, b is an integer from 0 to 4 and the sum of a+b is the valence of the Ti atom, and wherein at least 80% of said titanium metal compound is reduced to the Ti$^{3+}$ valence state by contact with;
   ii) an aluminum compound that is introduced as a compound of the formula: R$^2_c$Al(OR$^2$)$_d$X$_{3-(c+d)}$ wherein each R$^2$ is the same or different C$_{1-10}$ alkyl radical, X is a chlorine atom, c is an integer from 0 to 3, d is an integer from 0 to 3 and the sum of a+b is from 0 to 3; and
   iii) a spheroidal magnesium chloride support, wherein the magnesium chloride support comprises particles with a mass average diameter Dm of from 10 to 40 μm, and a particle size distribution characterized by a Dm/Dn of less than 1.5.

2. The process of claim 1 wherein the resulting polymer contains less than 0.75 ppm titanium metal.

3. The process of claim 1 wherein the resulting polymer has a bulk density, in granular form, of at least 23 lbs/ft$^3$.

4. The process of claim 1 wherein the resulting polymer has a bulk density, in granular form, of at least 24 lbs/ft$^3$.

5. The process of claim 1 wherein the titanium metal compound is introduced as titanium tetrachloride and is reduced to titanium trichloride.

6. The process of claim 1 wherein the aluminum compound is triethyl aluminum.

7. A spheroidal Ziegler-Natta type olefin polymerization catalyst having a particle size distribution characterized by a Dm*/Dn of less than 3.0, wherein said catalyst comprises:
   i) a titanium metal compound, wherein at least 80% of said titanium metal compound is in the Ti$^{3+}$ valence state;
   ii) an aluminum compound; and
   iii) a spheroidal magnesium chloride support, wherein the magnesium chloride support comprises particles with a mass average diameter Dm of 5 to 40 μm, and a particle size distribution characterized by a Dm/Dn of less than 1.5.

* * * * *